Dec. 25, 1962  S. H. JOHNSON ETAL  3,069,839
PARKING METER
Filed July 13, 1960  6 Sheets-Sheet 1

Inventors
Sven Herbert Johnson
Anders Artur Wallerius Holmström
by James A. Marble
Their Attorney Dec. 25, 1962  S. H. JOHNSON ETAL  3,069,839
PARKING METER
Filed July 13, 1960  6 Sheets-Sheet 2

Dec. 25, 1962  S. H. JOHNSON ET AL  3,069,839
PARKING METER
Filed July 13, 1960  6 Sheets-Sheet 3

United States Patent Office 3,069,839
Patented Dec. 25, 1962

3,069,839
PARKING METER
Sven Herbert Johnson, Gandviksvagen 7, Djursholm, Sweden, and Anders Artur Wallerius Holmström, Hantverkargatan 8, Stockholm, Sweden
Filed July 13, 1960, Ser. No. 42,613
Claims priority, application Sweden July 17, 1959
3 Claims. (Cl. 58—141)

The invention relates to a parking meter adapted for mounting in a car on a place visible from outside. The principal object of the invention is to avoid, firstly, the large costs involved in setting up as well as maintaining parking meters hitherto known and, secondly, the obstacle to traffic which these known parking meters with their stands represent. According to the invention, this is substantially attained by providing an apparatus comprising a clock work enclosed in a sealed cover, said clock work being drivingly connected, on one hand, with a counter which may be set for various speeds from the outside of the cover and which is pre-set to a total operating period and, on the other hand, with an assembly which is arranged, after setting a desired clock work running time from the outside of the cover, and after starting the clock work, to automaticaly stop the clock work and hence also the counter at the expiration of this time, the settings of the counter as well as of the assembly as also the running or stand-still, respectively, of the clock work being visually observable from the outside of the cover.

The invention will be described in greater detail below with reference to the embodiment shown by way of example in the attached drawings, in which connection also other features characterizing the invention will be defined.

Figure 1:
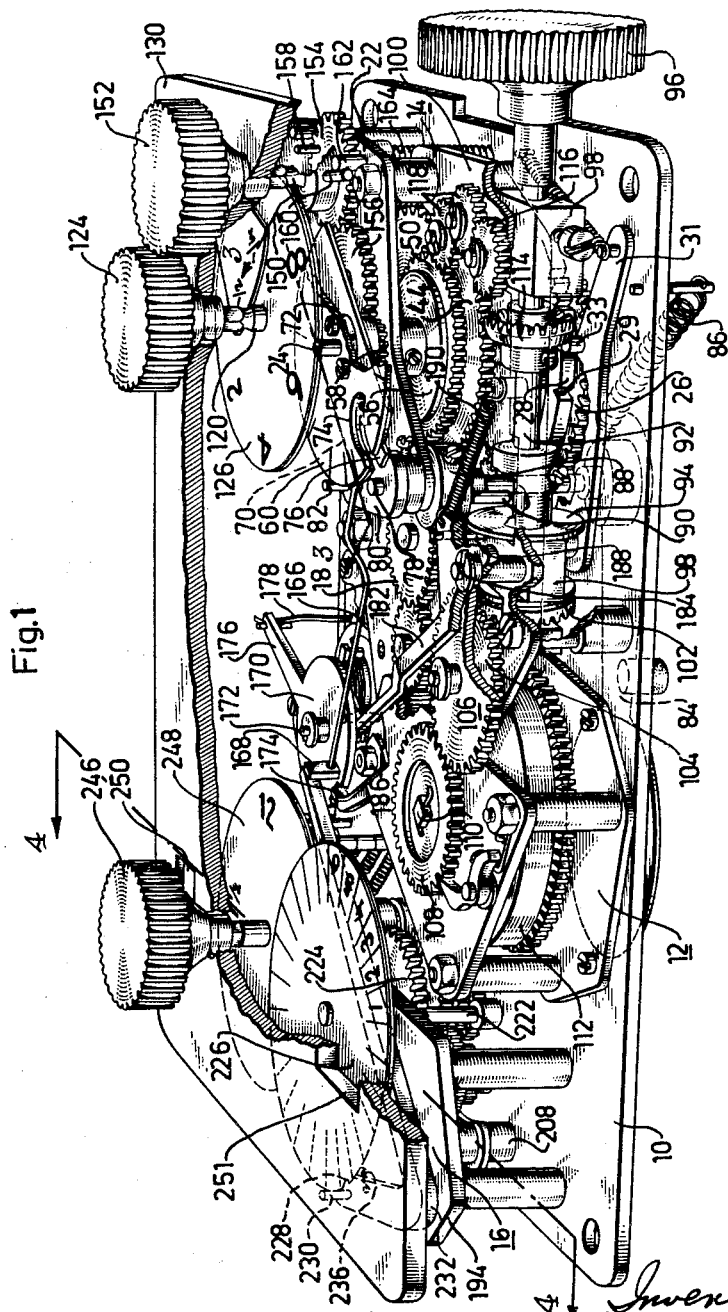
FIG. 1 is a perspective view of a parking meter, constructed according to the invention, some parts being assumed to be broken away.

Referring to the drawings, the reference numeral 10 denotes a common mounting plate for three co-operating assemblies, generally designated 12, 14 and 16 and forming the fundamental parts of a parking meter.

In the present case the assembly 12 consists of a spring-driven clock work known per se, which is provided with two outgoing gear pinions 18, 20, one of which denoted by 18 (FIG. 1) driving the assembly 14 and the other denoted by 20 (FIG. 4) the assembly 16. Generally speaking assembly 16 has for its object to permit setting of the parking time allowed, for instance, from a quarter of an hour to 12 hours, which setting in a way to be seen from the following has the effect that the clock work 12, after being started, drives during the period set the assembly 16 serving as a counter with a speed determined by the last mentioned assembly being set on the fee per hour established for the parking place in question, whereupon the clock work is stopped automatically by being actuated by the assembly 14.

The members forming part of the assemblies are mostly mounted on parallel shafts as in an ordinary clock work, said shafts being carried in plates which by means of spacers and securing means are held parallel with and at certain distances from each other. For the sake of clearness, these known spacers and securing means as well as most of the parts of the clock work assembly have not been included in the description below.

Figure 2:
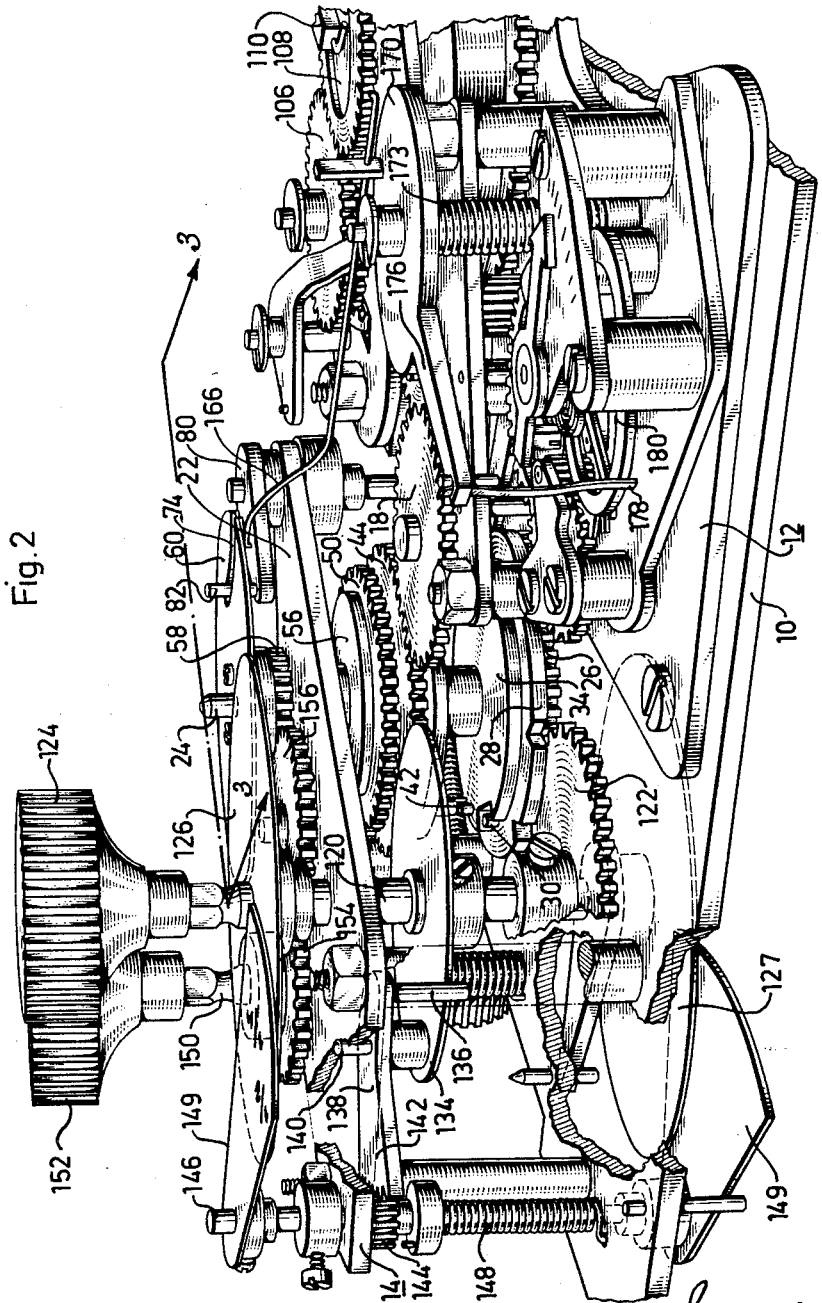
FIG. 2 is a perspective view of the right portion of FIG. 1 seen from the opposite direction.
Figure 3:
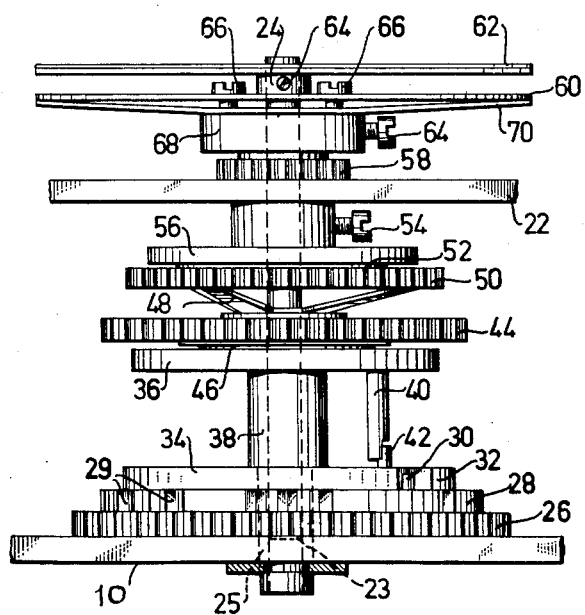
FIG. 3 shows separately a side elevation of a series of gears and discs rotatable about a common axis, said gears and discs forming part of the portion shown in FIG. 2, this view being taken substantially as indicated by the line 3—3 in FIGS. 1 and 2.

The structural design of the assembly 14 is as follows:
In the mounting plate 10 and a plate 22 located above it two coaxial shafts (FIG. 3) are mounted, one of which being formed as a sleeve 25 inside which one end 23 of the other shaft 24 is rotatably carried. On the sleeve-shaped shaft a gear 26 is secured adjacent the mounting plate 10 and above said gear there is a circular disc 28 likewise rigidly connected to the sleeve shaft, said disc having along its periphery recesses 29 for snap-like co-operation with a stud 33 (FIG. 1) secured to a spring actuated rocking lever 31 and having adjacent its periphery an upstanding pin 30. The pin 30 is attached to disc 28 as shown in FIGS. 2 and 3 and engages a recess 32 in the periphery of a circular disc 34 likewise disposed on the sleeve shaft but freely rotatable in relationship thereto. Above the disc 34 the shaft 24 follows and supports a circular disc 36 which is spaced above the disc 34 and is rigidly connected to the shaft by means of a hub portion 38 between discs 34 and 36. On its side facing the disc 34 the disc 36 has an axially extending pin 40 which lies at the same radial distance from the axis of shaft 24 as an oppositely directed pin 42 secured to the disc 34. Above the disc 36 there is mounted freely rotatable on the shaft 24 a gear 44 which is driven by the gear pinion 18 and which is connectable to the disc 36 by means of friction plates 46 disposed between these elements. The pressure necessary for clutching is obtained from a member disposed on the shaft, said member engaging by means of a resilient spider 48 a gear 50 freely rotatable on the shaft 24. The gear 50 is actuated, via a further plate clutch 52, by a circular disc 56, which is lockable to the shaft 24 by means of a set screw 54. Above the disc 56 the shaft 24 continues through the upper plate 22 and here it carries a gear 58 rigidly secured to the shaft and, above this gear, two axially spaced circular discs 60, 62, which by means of set screws 64 are lockable to the shaft. The upper disc 62 is a scale disc whose function will be described in the following.

The lower circular disc 60 is secured by means of screws 66 in a hub element 68 in which the set screws 64 are mounted. As seen from FIGS. 1 and 3, a cone-shaped disc 70 is disposed between this hub element and the disc 60, said disc 70 consisting of resilient material and being somewhat curved longitudinaly so that it presses with its ends upon the underside of the disc 60. The cone-shaped disc 70 is rotatable about the shaft 24 by being provided in its center with a circular opening 72 which guides the turning movement of the disc on the screws 66. Furthermore, the disc 60 as well as the disc 70 has a slot 74 which extends arcuately from the periphery towards the center of the disc. Adjacent the slot 74 the lower disc 70 has a tongue 76 extending outside the discs.

Outside the discs 60, 70 a shaft 78, which is parallel with the shaft 24, is carried in the plates 10, 12, upon which shaft 78 and above the disc 22 a rocking lever 80 is secured at one end. Adjacent the opposite end of the rocking lever there is mounted a pin 82, which is parallel with the shaft 78 and tends to engage, by the shaft 78 being spring-actuated, the periphery of the disc 60 and to enter into the arcuate slot 74 when the disc has a certain angular position. Said spring action is provided by a rocking lever 84 (FIG. 5), whose one end is non-rotatably secured to the shaft 78 below the plate 10. Said rocking lever 84 is appropriately connected with one end of a helical spring 86 in order to attain the desired turning of the shaft 78, the opposite end of the spring secured to the plate 10. The rocking lever 84, which in the present case is made of a piece of sheet plate, is formed at its free end as a circular disc and may assume two different positions determined by the position of the pin 82 along the periphery of disc 60 or the position of the pin in the slot 74, respectively. In the last mentioned position the circular portion of lever 84 will be in front of a disc 85, which is secured on the second-wheel shaft of the clock work assembly 12.

Below the upper mounting plate 22 there is secured to the shaft 78 a ring 88 having a downwardly directed pin 90, which is spaced from the shaft and parallel with the same. Said pin 90 is intended to co-operate with a disc 94 secured to a shaft 92 extending at right angles to the shaft 78. The shaft 92, which at one end carries a knob 96 outside the bottom plate 10, is axially displaceable and rotatably mounted in two spaced blocks 98 which are secured to a mounting plate 100 located above the bottom plate. When the shaft 92 is axially displaced the disc 94 will actuate the pin 90 when this assumes a certain position so as to rotate the shaft 78.

At the end of shaft 92 remote from knob 96 the shaft carries a ring gear 102, which is non-rotatably connected with the shaft 92, independently of the axial position of the latter, and engages continuously a gear 104 carried on the mounting plate 100. This gear is rotatable together with a gear 106 mounted on the same shaft and in turn engaging a ratchet gear 108, which is secured to the shaft 110 of the clock work 12 for winding the clock work spring, whose housing is designated 112. Between the blocks 98 a further ring gear 114 is secured to the shaft 92, said ring gear 114 in one axial position of shaft 92 engaging a gear 116 rotatably carried on the mounting plate 100. The gear 116 is drivingly connected, via idler gears 118, with a gear 50 mounted freely rotatable on the shaft 24.

Parallel with and spaced from the shaft 24 there is rotatably carried in plates 10, 20 a shaft 120, which supports adjacent the bottom plate 10 a gear 122 secured to the shaft, said gear 122 engaging the gear 26 secured to the sleeve-shaped shaft 25. At the end of the shaft 120 remote from the gear 122 a knob 124 is mounted, and inwardly of this knob a disc 126 is attached on whose top side, along the periphery, figures are provided. In the various angular positions of shaft 120 these figures are intended to be observed in a window 128' (FIG. 7) formed in a plate 130 constituting the back cover of a box-shaped housing 132 enclosing the assemblies 12, 14, 16. A disc 127 provided with corresponding figures is also secured to the shaft 120 outside the plate 10 so that these figures appear in a second window 128 on the front side of the housing (FIG. 6), the two windows being located right opposite one another.

The just mentioned figures on the disc 126 are intended to indicate the parking time allowed. In setting small time intervals, such as a quarter of an hour, the turning movement of the disc will be very small for reasons to become evident from the following, and one would therefore hardly be able to distinguish the figures from each other in the windows 128, 128'. In order to obviate this inconvenience a gearing device is developed, which may be seen in FIG. 2. This gearing device consists of a cam disc 134 secured to the shaft 120, said cam disc coacting with a pin 136 extending parallelly with the shaft, which pin is secured at one end of a rocking lever 138. Spaced from the pin the rocking lever is rotatably mounted on a pin 140 secured to the mounting plate 22. At the end of the rocking lever remote from pin 136 the lever is formed as a toothed segment 142. This segment engages a gear 144 secured to a shaft 146 carried in the plates 10, 22, the shaft 146 carrying a flag 149 above the figure disc 126 as well as under the plate 10. Moreover, a helical spring 148 is passed over the shaft, said spring being secured to the shaft and the bottom plate 10 in such a way that the pin 136 is spring-actuated to engage the periphery of the cam disc 134. The latter is circular to the most part and when the pin 136 follows this circular portion of the disc the flags 149 will be beside the windows 128, 128' so that the figures on the discs 126, 127 will apear in these windows. However, a part of the periphery of the cam disc 134 is somewhat displaced towards the center of the disc which has as a result that, when the pin 136 moves along this peripheral part, the rocking lever 138 transmits the motion to the gear 144 by way of the toothed segment 142 so that the shaft 146 rotates and therefore moves the flags 149 ahead so that the figures marked on the same appear in the windows 128, 128'.

Beside the disc 126 still another shaft 150 is mounted between the plates 10, 22, said shaft carrying at its upper end a knob 152 and below this knob a gear 154. This gear, being freely rotatable on shaft 150, is drivingly connected via an idler gear 156 with the uppermost gear 58 secured to the shaft 24 but has a pin 158 which is spaced from the shaft 150 and extends parallelly to the same. This pin 158 is intended to co-operate with a pin 160 extending radially from the shaft. The last mentioned pin is held to abutment against a stop 162, secured to the plate 22, by means of a helical spring 164 passed over the shaft 150, one end of the spring being secured to the shaft and the other to the bottom plate 10. When the shaft has been rotated a certain part of a revolution the pin 160 strikes the pin 158 thereby turning the gear 154 and thus also the gear 58 with its associated shaft 24.

For establishing a co-operation between the assembly described above and the clock work, one end of a wire 166 is secured to the rocking lever 80 at a point spaced from the shaft 78 of said lever, the opposite end of the wire passing through a hole in a stud 168 secured adjacent the periphery of a circular disc 170. This disc 170 is rotatably mounted on a shaft 172 whose one end is secured to the bottom plate 10. The angular movement of the disc 170 is confined by the disc having in its periphery an elongated recess into which a stop member 174 enters which is secured to the clock work. From the disc 170 an arm 176 extends at whose end a narrow leaf spring 178 is attached, which in a certain angular position of the disc 170 engages the balance wheel 180 of the clock work, thereby stopping the work. In another angular position, into which the disc is moved by means of a helical spring 173 passed over the shaft 172, the leaf spring 178 releases the balance wheel so that the clock work is re-started. The wire 166 runs freely through the hole in the stud 168, but outside the latter it has a stop, e.g. in the form of a bent-over end portion which causes the disc 170 to turn when the wire 166 moves rightwardly as viewed in FIG. 1, that is, when the pin 82 enters the slot 74. In addition, there is for said co-operation a rocking lever 182 which is rotatable intermediate its ends on a shaft 184. One end of the lever 182 co-operates with a pin 186 (FIG. 1) disposed below the disc 170 so that a rocking movement of the lever 182 causes the leaf spring 178 to engage and disengage the balance wheel 180. This rocking movement is brought about by the lever 182 carrying at its opposite end a pin 188 coacting with the disc 94 secured to the shaft 92 so that the rocking lever is rotated when the disc is caused to assume various positions by means of the shaft 92. The lever 182 is actuated by a helical spring 190 tending to hold the pin 188 to abutment against the disc 94.

Figure 4:
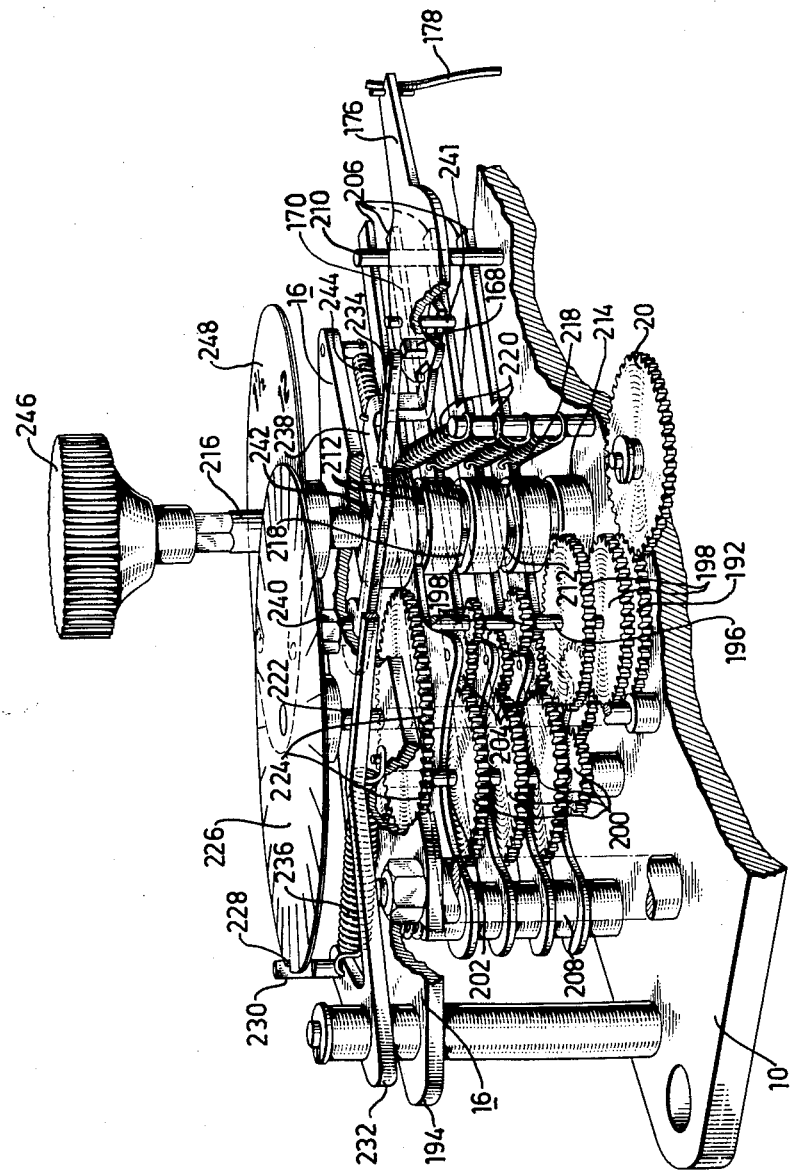
FIG. 4 is a perspective view of the left portion of FIG. 1 seen from the opposite direction and taken substantially as indicated by the line 4—4 in FIG. 1.

As previously mentioned the clock work 12 has a further output gear 20, which drives the assembly 16 serving as a counter (FIGS. 1 and 4). For this purpose the gear 20 engages a gear 192 secured to a shaft 196 carried in the bottom plate 10 and an upper mounting plate 194. On this shaft 196 there is further secured a series of gear reduction wheels 198 whose rotational movement is to be transmitted in dependence of the desired gear ratio to a corresponding number of gear reduction wheels 200 secured to a second shaft 202, which is carried like the first shaft 196 between the plates 10 and 194. For transmitting the rotary motion between the gear reduction wheels 198 and 200, a series of idler gears 204 are arranged freely rotatable on rocker arms 206, which at one end are mounted on a shaft with interposed spacers 208 and at the other are arranged to abut against a stop pin 210 when the idler gears are engaged. Between their last mentioned ends and the idler gears the arms engage the bottom of grooves 212 formed in the surface of a cylinder 214 which is non-rotatably secured to a shaft 216 mounted between the plates 10, 194. In the grooves 212, at various points about the cylinder 214, there are ground-down portions 218 which, when making contact with the rocker arms 206, by turn engage the idler gear 204 for obtaining various gear ratios between shafts 196 and 202. The arms 206 are held to engagement against the bottom of grooves 212 by means of helical springs 220. The rotary movement of the shaft 202 is transferred to still another shaft 222, carried between the plates 10, 194, via a gear reduction wheel indicated at 224 in FIGS. 1 and 4. In addition, the shaft 222 carries above the plate 194 a disc 226 provided with figures along its periphery. This disc has at a point of its periphery a notch 228 for coacting with the pin 230 secured to one arm of a bell crank 232, whose other arm 234 coacts with the stud 168 on the disc 170, which actuates the balance wheel of the clock work, in such a way that when the pin 230 snaps into the notch 228 under the action of a spring 236 the disc 170 will assume a position wherein the motion of the balance wheel is stopped. The disc 170 may also be biased to the last mentioned position by the assembly 16 by means of a member comprising a spring actuated arm 238 which at one end 240 is rockably carried in the upper mounting plate 194 and has its opposite end extending below the disc 170 for actuating a pin 241 secured to said disc. Intermediate its ends the arm 238 abuts a square collar 242 secured to the shaft 216, being forced against this collar by means of a helical spring 244. When the shaft 216 is rotated by means of a knob 246, which is secured to its one end, for engaging the various gear trains, the arm 238 passes across the corners of the square collar and is pivoted thereby so as to strike the pin 241, the disc 170 then being rotated to the position wherein it locks the balance wheel of the clock work. This device has the effect that the clock work can only operate when the shaft 216 assumes in the present case four different angular positions corresponding to four figures, which are marked on a disc 248 connected to the shaft 216 and which may be observed when positioned opposite windows 250 and 250' provided in the front and back sides of the housing 132. Said figures indicate the hourly parking fee.

The disc 226 is provided with suitably spaced markings, as shown in FIGS. 1 and 4, and these markings may be numbered from one to twenty-five or in any other desired manner. Each mark on disc 226 indicates a coin unit, such as, a dime, and in case twenty-five marks are provided, the cost of setting the meter for maximum parking time will be two dollars and fifty cents. The numbers on disc 226 are visible through a window 251 in the back cover 130 of the housing 132, as shown in FIG. 7, and the particular number which is visible indicates the unused portion of the amount originally deposited with the parking authority.

Figure 7:
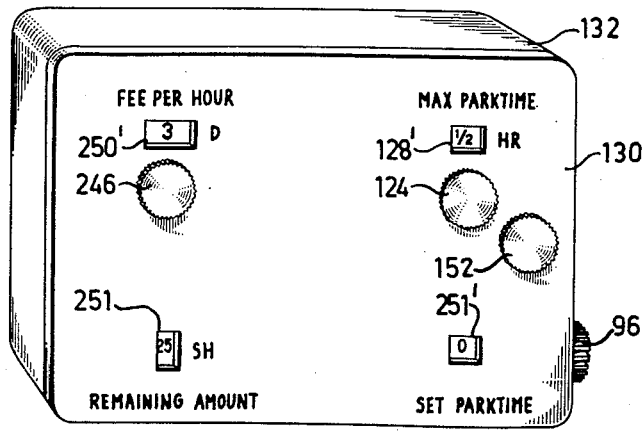

The disc 62 is provided with suitably spaced markings numbered from zero to any desired number and such numbers are visible through window 251' in the back cover 130 of the housing 132, as shown in FIG. 7. The number visible in the window 251' indicates the time remaining for a particular parking period.

When the parking meter described above is to be used it is arranged in a suitable bracket which, for instance, may be mounted on the instrument panel of a motor car. The meter is presented to the parking authority and upon payment of the proper sum, the counter 16 is set to provide a given total parking sum of, for example two dollars and fifty cents which is indicated on the disc 226 through the window 251, that is to say that the pin 230 has moved up from the notch 228 onto the periphery of the disc 226. This means that the arm 232 is in a position wherein it is unable to actuate the disc 170 over the stud 168 to swing the disc into a position where it brakes the balance wheel 189 of the clock work 12 until after the disc 226 has rotated one revolution at which time the pin 230 re-enters the notch 228. The housing 132 of the parking meter with its back cover 130 is then applied and sealed in any suitable manner by the parking authority to prevent tampering or changing of the setting without payment of a further fee.

When a motor car is to be parked on a street where, for instance, the parking time allowed is half an hour and the fee 3:-kr. per hour, the knob 246 of the counter is turned until the figure "3" is visible in the windows 250 and 250'. This serves to actuate rocker arm 206 and idler gear 204 to connect the shafts 196 and 202 through such a gear ratio that the shaft 222 with its disc 226 is driven via the gear 224 at a speed corresponding to the set parking fee per hour. The coupling movement of the arm 206 is caused, as previously mentioned, by the arm dropping into the ground-down portion 218 in its groove 212 in the cylinder 214.

Thereupon the assembly 14 is set to the parking time as indicated by the disc 126 or flag 149 through the windows 128 and 128' allowed by starting from a zero position wherein the pin 82 of the assembly lies in the slot 74 of the discs 60, 70. The setting is performed by the knob 124 being rotated until the parking time just mentioned, i.e. half an hour, appears in the windows 128, 128', the flags 149 indicating as previously mentioned the parking time by the pin 136 sliding into the recessed portion of the disc 134 on the knob shaft 120. As a result the gear 122 is rotated which engages the gear 26 secured to the sleeve-shaped shaft 25 (FIG. 3), said gear 26 thus being rotated simultaneously together with the disc 28 secured higher up on the sleeve shaft, which disc in turn brings with it, by means of the pin 30, the disc 34, which is freely rotatable on the sleeve shaft. The angular position provided for these three elements 26, 28, 34 is determined by the pin 33 of the rocking lever 31 (FIG. 1) snapping into the recess 29 of the disc 28 which corresponds to the selected setting. As will be appreciated, by the setting described also the pin 42 upstanding from the disc 34 has obtained a fixed angular position. As the second step of the setting operation the knob 96 with its shaft 92 is pulled rightwards as viewed in FIG. 1. In doing so the pin 90 will be moved by the disc 94 secured to the shaft 92 in such a way that the pin 82 of the rocking lever 80 slides out of the slot 74 to a position outside the periphery of the disc 60. While being pulled out the knob 96 is rotated and thus rotation is also imparted to the shaft 92 and the ring gear 114, which then engages the gear 116, and the ring gear 102 drivingly connected to the spring of the clock work 12. The rotation of gear 116 is transferred via the gear 118 to the gear 50 freely mounted on the shaft 24, said gear 50 in turn transferring the motion by way of the clutch discs 52 to the disc 56, rigidly secured to the shaft 24, and therefore to the shaft 24. The rotatonal motion of the shaft is imparted to the disc 36 and the discs 60, 70 and the disc 62, which motion continues until the pin 40 of the disc 36 strikes the pin 42 of the disc 44, at which time the motion stops. Any continued rotation of knob 96 only causes the gear 50 to slip on the shaft 24. When the rotation of the shaft ceases, the discs 60, 70 will, of course, cease rotating simultaneously and the setting is carried through, as the pin 82 now rests against the periphery of the disc 60 at a distance from the slot 74 corresponding to the distance a peripheral point of the disc will travel clockwise according to FIG. 1 during 30 minutes. As will be appreciated, the angular travel of the shaft 120 will be very small in this case as the disc 126 in the example illustrated is turned one revolution in twelve hours by the clock work, which would explain why it is advisable to provide the gearing device turning the flags 149.

During the setting described above whilst the knob 96 is pulled out, the rocking lever 182 actuates, by the action of the spring 190, the pin 186 on the disc 170 so that the latter is held in a position wherein the spring 178 engages the balance wheel 180 of the clock work to block the same. When the knob 96 with its shaft 92 is thereupon brought left-wards according to FIG. 1, in order to start recording of the parking time, the disc 94 makes contact with the pin 188 of lever 182 and displaces this pin in such a way that the actuation just mentioned of the disc 170 ceases, which in turn results in the spring 178 leaving the balance wheel of the clock work and the work starts. Hereby the driving power of the clock work is transferred in part from the gear 20 to the counter 16 and in part from the gear 18 to the gear 44, which is freely rotatable on the shaft 24 and whose rotational motion is transferred to the shaft by way of the disc clutches 46, 52 and the discs 36 and 56. Simultaneously herewith the discs 60, 70 rotate clockwise (FIG. 1) and in doing so they travel along the pin 82 until this snaps into the slot 74 which will take place, in the example illustrated, 30 minutes after the clock work has been started. On the snapping in of the pin 82 the lever 80 is swung, which has as a consequence that the wire 166 turns the disc 170 by means of the stop formed on it outside the stud 168, so that the clock work is stopped by means of the leaf spring 178.

Figure 5:
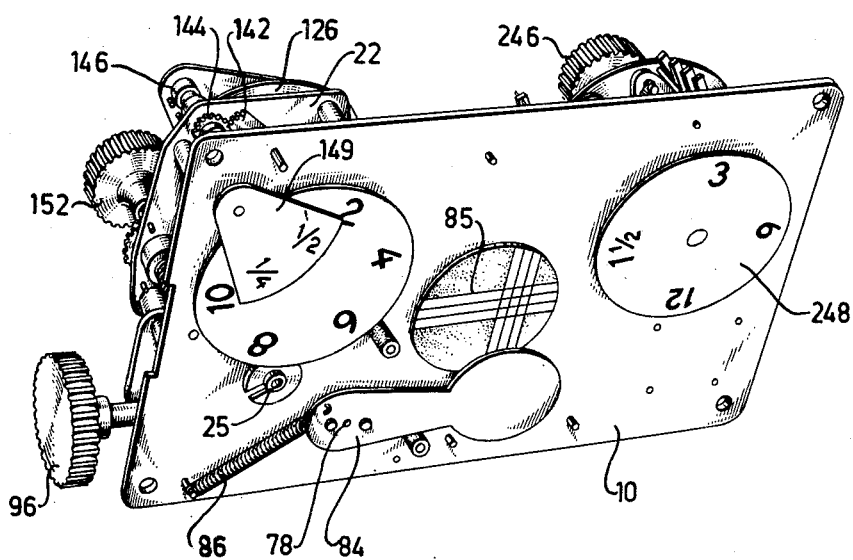
FIG. 5 is a perspective view of the parking meter shown in FIG. 1 represented on a smaller scale and seeen obliquely from below.
Figure 6:
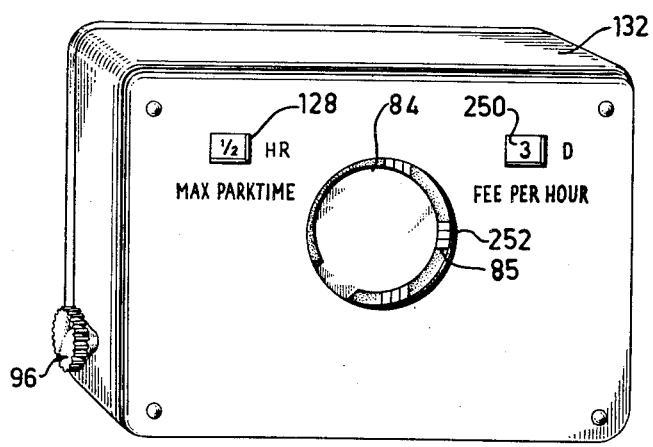
FIG. 6 is a perspective view of the front side of the parking meter and including a cover and FIG. 7 is a perspective view of the rear side of the parking meter and including a cover.

During the setting and consumption of parking time described above, the following will take place on the side of plate 10 shown in FIG. 5. When the lever 80 is swung out, that is, when its pin leaves the slot 74, the lever 84 secured to the same shaft 78 is brought to move over to the position shown in the figure while exposing the disc 85 mounted on the second-wheel shaft of the clock work, which disc 85, with the clock work running is visible from the outside through a window 252 provided in the wall of the housing (FIG. 6). When the pin 82 at the expiration of the parking time re-snaps into the slot 74 during the action of the spring 86, the arm 84 swings up to a position in front of the disc 85, the circular portion of the arm 84 then being visible in the window 252, thus indicating that the parking time has expired.

If one after a parking period being set would wish to change it to a shorter period, this may take place with no other measure than the knob 124 being turned until the new period desired appears in the windows 128 and 128'. This is enabled by the fact that at this re-adjustment the pin 42 will bring the pin 40 along (FIG. 3) which results in a re-setting of the discs 60, 70 on a new parking time. On the other hand, if one should turn the knob 124 towards a longer parking time, with no further measures, the pin 42 will move away from the pin 40 for which reason no rotation of the shaft 24 will take place, and thus not of the discs 60, 70 either. Hence, the clock work 12 will stop after expiration of the previously set, shorter parking period.

A setting of a longer parking period requires that the assembly 14 is restored to the initial condition wherein the pin 82 is in the slot 74. This initial condition is brought about by means of the knob 152. When this is turned clockwise according to FIG. 1, the pin 160 radially secured to the shaft 150 strikes the pin 158 on the gear 154 after a certain turning of the knob 152, so that when this knob 152 is further rotated the gear 154 will be brought along and thereby transfer the rotation by way of the gear 156 to the gear 58 secured to the shaft 24. As will be appreciated, the rotation transferred in this manner to the shaft 24 will have as a consequence that the pin 82 after a certain rotation snaps into the slot 74.

As stated above, in the present case the disc 126 rotates one revolution in twelve hours. Thus, in setting a parking period of twelve hours the whole periphery of the disc 60 must be utilized and this is made possible by the occurrence of the disc 70. The fact is that in turning the disc 60 a complete revolution the pin 82 will strike at the end of the turning the tongue 76 of the tape-shaped disc 70, the latter then turning in such a way that its periphery fills out the periphery of the disc 60 by bridging the slot 74. The restoration of the tape-shaped disc 70 to the position shown takes place in the same manner when the disc 60 turns back a complete revolution.

As a matter of course, the invention is not confined to the embodiment shown but may be varied in many other respects within the scope of the concept underlying the invention. Thus, for recording a parking time free of charge, the driving connection between the clock work 12 and the counter 16 may be disconnectable.

What we claim is:

1. A parking meter comprising a housing, a cover removeably secured to said housing, a clock work disposed in said housing, a rotatable indicator driven by said clock work, a window in said housing for observing said indicator, a counter disposed in said housing, variable speed gearing connecting said clock work and said counter to drive said counter at a selected speed, manual means exteriorly of said housing for selecting said speed in accordance with a selected parking rate, means for indicating the selected parking rate, windows in said housing and cover for observing said last named means, means driven by said counter for indicating the amount remaining of a pre-paid parking fee, a window in said cover for observing said last named means, a gear train assembly disposed in said housing and driven by said clock work, a disc driven by said assembly, markings on said disc indicating the time remaining in a given parking period, a window in said cover for observing said markings, manual means exteriorly of said housing for setting the desired parking time and manual means exteriorly of said housing for starting and stopping said clock work.

2. A parking meter as defined in claim 1 in which means is provided for indicating the maximum parking time permitted at a particular location.

3. A parking meter comprising a housing, a cover removeably secured to said housing, a clock work disposed in said housing, a counter disposed in said housing, variable speed gearing connecting said clock work and said counter to drive said counter at a selected speed, manual means exteriorly of said housing for selecting said speed in accordance with a selected parking rate, means for indicating the selected parking rate, windows in said housing and cover for observing said last named means, means driven by said counter for indicating the amount remaining of a pre-paid parking fee, a window in said cover for observing said last named means, a gear train assembly disposed in said housing and driven by said clock work, a disc driven by said assembly, markings on said disc indicating the time remaining in a given parking period, a window in said cover for observing said markings, manual means exteriorly of said housing for setting the desired parking time and manual means exteriorly of said housing for starting and stopping said clock work.

References Cited in the file of this patent

UNITED STATES PATENTS

| | | |
|---|---|---|
| 2,591,402 | Campbell | Apr. 1, 1952 |
| 2,709,039 | McGay | May 24, 1955 |
| 2,911,144 | Lee et al. | Nov. 3, 1959 |

FOREIGN PATENTS

| | | |
|---|---|---|
| 1,110,446 | France | Oct. 12, 1955 |
| 561,602 | Canada | Aug. 12, 1958 |